(12) United States Patent
Marza et al.

(10) Patent No.: US 8,793,113 B2
(45) Date of Patent: Jul. 29, 2014

(54) METHOD AND APPARATUS FOR NEAR WELL STRUCTURAL MODELING BASED ON BOREHOLE DIPS

(75) Inventors: Philippe Marza, Beijing (CN); Arnaud Etchecopar, Clamart (FR); Kang Wang, Beijing (CN); Mi Zhou, Beijing (CN); Shiduo Yang, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 393 days.

(21) Appl. No.: 12/966,716

(22) Filed: Dec. 13, 2010

(65) Prior Publication Data

US 2011/0282634 A1 Nov. 17, 2011

Related U.S. Application Data

(60) Provisional application No. 61/334,758, filed on May 14, 2010.

(51) Int. Cl.
   *G06G 7/48* (2006.01)

(52) U.S. Cl.
   USPC .......................................................... 703/10

(58) Field of Classification Search
   USPC .......................................................... 703/10
   See application file for complete search history.

(56) References Cited

U.S. PATENT DOCUMENTS

| | | |
|---|---|---|
| 4,357,660 A | 11/1982 | Hepp |
| 4,414,656 A | 11/1983 | Hepp |
| 4,698,911 A | 10/1987 | Rambow |
| 4,873,636 A | 10/1989 | Hepp |
| 5,388,044 A | 2/1995 | Hepp |

OTHER PUBLICATIONS

Ozkaya, Sait, "KINKFOLD—An AutoLISP Program for Construction of Geological Cross-Sections Using Borehole Imaging Data", Computers and Geosciences 28, pp. 409-420, 2002.*
Amer et al, "Geological Modeling Using Azimuthal Density Neutron Images: A Case Study in Khamilah Field, Northwest Oman", SPE 92721, 2005.*
Hepp, Vincent, "On the Integration of Dipmeter Surveys"; The Log Analyst, Jul.-Aug. 1992; pp. 399-414.
Etchecopar, A., et al., "Methods for Geological Interpretation of Dips"; Etudes et Productions Schlumberger; 19 pages, 1992.
Etchecopar, Arnaud, et al., "Cross Sections from Dipmeter Data"; The American Association of Petroleum Geologists Bulletin, vol. 76, No. 5 (May 1992); pp. 621-637, 25 Figs.
Etchecopar, "Diptrend: Method and Automatiac Programs for Geological Analysis of a DIP File," Proceedings of the Wireline, Testing & Seismic Interpretation Symposium, 1991: pp. 1-28.

* cited by examiner

*Primary Examiner* — Mary C Jacob

(57) ABSTRACT

A method for structure modeling of a formation penetrated by multiple wells includes obtaining borehole dips from borehole measurements; filtering the borehole dips based on a dip sequence analysis; computing structural dips based on the filtered dips; computing structural delineation by using the structural dips; projecting the structural dips to horizon point sets based on the structural delineation; and generating stratigraphic surfaces by mapping the projected horizon point sets. A system for structure modeling of a formation penetrated by multiple wells includes a processor and a memory that store a program having instructions for: obtaining borehole dips from borehole measurements; filtering the borehole dips based on a dip sequence analysis; computing structural dips based on the filtered dips; computing structural delineation by using the structural dips; projecting the structural dips to horizon point sets based on the structural delineation; and generating stratigraphic surfaces by mapping the projected horizon point sets.

20 Claims, 17 Drawing Sheets

METHOD AND APPARATUS FOR NEAR WELL STRUCTURAL MODELING BASED ON BOREHOLE DIPS

BACKGROUND OF INVENTION

1. Field of the Invention

This invention relates to geological structural modeling of subsurface rock formations based on well log data.

2. Background Art

Information about formation dips is important in oilfield exploration. For example, dip information may be used to determine the locations of particular zones (e.g., shale zone, sand zone, etc.) within a formation. This information may be used to determine whether or how a well can be drilled in an appropriate formation.

Formation dips may be measured on a small scale (i.e., a few centimeters) or on a large scale (i.e., tens of meters). The measurement of dips on a small scale may be performed with resistivity-type well logging tools, such as a Fullbore Formation MicroImager (FMI™) tool, a Dipmeter tool, etc. The measurement of dips on a large scale may be performed using seismic equipment. Multiple well logs from one or more tools may be required to determine dip angles or other information related to dipping planes for a particular formation.

For example, dipmeters may be used to make high resolution micro-resistivity measurements around the borehole circumference, which may then be correlated to produce dip information. This information may be merged with tool orientation/navigation data to provide information on formation dips in the earth's frame of reference.

Once a dipmeter tool has traversed depths of a well, or an area of interest within the well, a plurality of resistivity logs are produced. By properly correlating the fluctuations of these resistivity logs, the positioning of a dipping plane relative to the tool position can be readily calculated.

For example, FIG. 1A shows a schematic illustrating a dipping plane 2 intercepting a borehole 4 at a dipping angle. A horizontal plane 6 is illustrated for comparison. The intercept between the dipping plane 2 and the borehole 4 is an ellipse. When the borehole image is rolled out into a 2D graph, the ellipse manifests itself as a sine curve (FIG. 1B). By such or similar analysis, apparent dip information (relative to the borehole or tool axis) may be derived.

Then, by measuring the bearing of the tool relative to some azimuthal reference, such as magnetic north, and the inclination of the tool relative to the true vertical or gravitational axis, the position of a dipping plane relative to the north and true vertical axes can be determined. To obtain an accurate dip angle, correlations of a number of signals may be necessary.

Various techniques for analyzing formation dips and formation modeling are known in the art. For example, U.S. Pat. No. 4,357,660, issued to Hepp, discloses methods and apparatus for processing measurements indicative of dips and azimuths of formation features in a borehole to produce three-dimensional representations of the formation features. U.S. Pat. No. 4,414,656, issued to Hepp, discloses a well logging system using the output of a dipmeter tool to produce a map showing various characteristics of the earth formations surrounding a borehole. U.S. Pat. No. 5,388,044, issued to Hepp, discloses a method of dipmeter processing that fits a thickness conserving mathematical model to a folded or faulted subsurface sedimentary geological structure to produce dip profiles.

Other disclosures related to dip analysis and modeling can be found in, for example: Etchecopar, A., Bonnetain, J. L., "*Cross sections from dipmeter data*," AAPG bull, V. 76, N0.5, Ppp. 621-637 (1992); Etchecopar, A., "*Diptrend: Method and automatic programs for geological analysis of a dip file*," Proceedings of the wireline, testing, & Seismic Interpretation Symposium (1991); and Etchecopar, A., Dubas, M. O., "*Automatic method for geological interpretation of Dips*," Proceeding of the SPWLA meeting. (Oklahoma City, Okla., 1992).

While these prior art methods are useful in dip analysis and formation modeling, there is still a need for systems and methods that can provide better models for formation dip analysis, especially models having dip information projected away from the wellbore into nearby formation.

SUMMARY OF INVENTION

One aspect of the invention relates to methods for structure modeling of a formation penetrated by multiple wells. A method in accordance with one embodiment of the invention includes: obtaining borehole dips from borehole measurements; filtering the borehole dips based on a dip sequence analysis; computing structural dips based on the filtered dips; computing structural delineation by using the structural dips; projecting the structural dips to horizon point sets based on the structural delineation; and generating stratigraphic surfaces by mapping the projected horizon point sets.

Another aspect of the invention relates to systems for structure modeling of a formation penetrated by multiple wells. A system in accordance with one embodiment of the invention includes a processor and a memory that store a program having instructions for: obtaining borehole dips from borehole measurements; filtering the borehole dips based on a dip sequence analysis; computing structural dips based on the filtered dips; computing structural delineation by using the structural dips; projecting the structural dips to horizon point sets based on the structural delineation; and generating stratigraphic surfaces by mapping the projected horizon point sets.

Other aspects and advantages of the invention will be apparent from the following description and the appended claims.

DETAILED DESCRIPTION

Embodiments of the invention relate to methods and apparatus for processing formation dips picked on borehole images of one or more wells drilled into geological formations. In accordance with embodiments of the invention, well log data may be subjected to dip sequence analysis, structural dip computation and structural delineation to provide information related to dip planes. This information about dipping planes may be combined with formation thickness maps and structural models to project (propagate) the structural dip points away from the borehole and onto selected formation top horizons. In accordance with embodiments of the invention, the dip points may be mapped onto a surface with respect to their positions, dip angles, and strikes. The resulting surfaces represent a 3D geometry of the geological formations in the near well space. From these modeled surfaces, a geologist can then derive accurate 3D visualizations, formation top maps, and other geological cross sections for formation evaluation.

Furthermore, outputs from methods of the invention may be combined with other subsurface visualization or analysis results (e.g., borehole or surface seismic data). Even when restricted to a minimum input data set (e.g., borehole image and a log for correlation), embodiments of the invention can provide unique capability for building structurally consistent 3D models of the subsurface formations.

Figure 1:
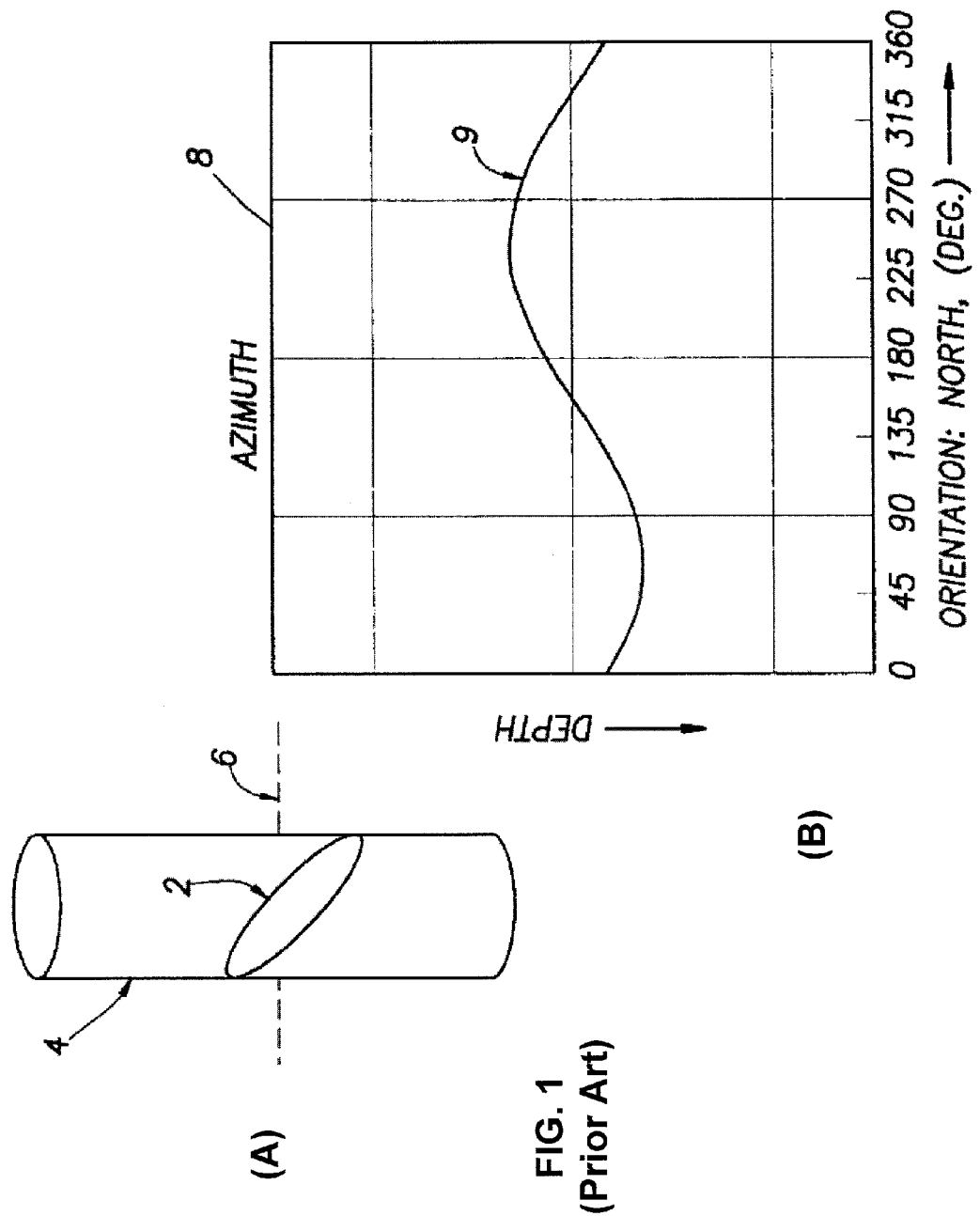
FIG. 1 shows a schematic of dipping plane intercepting a wellbore and a method of dip analysis known in the prior art.
Figure 2:
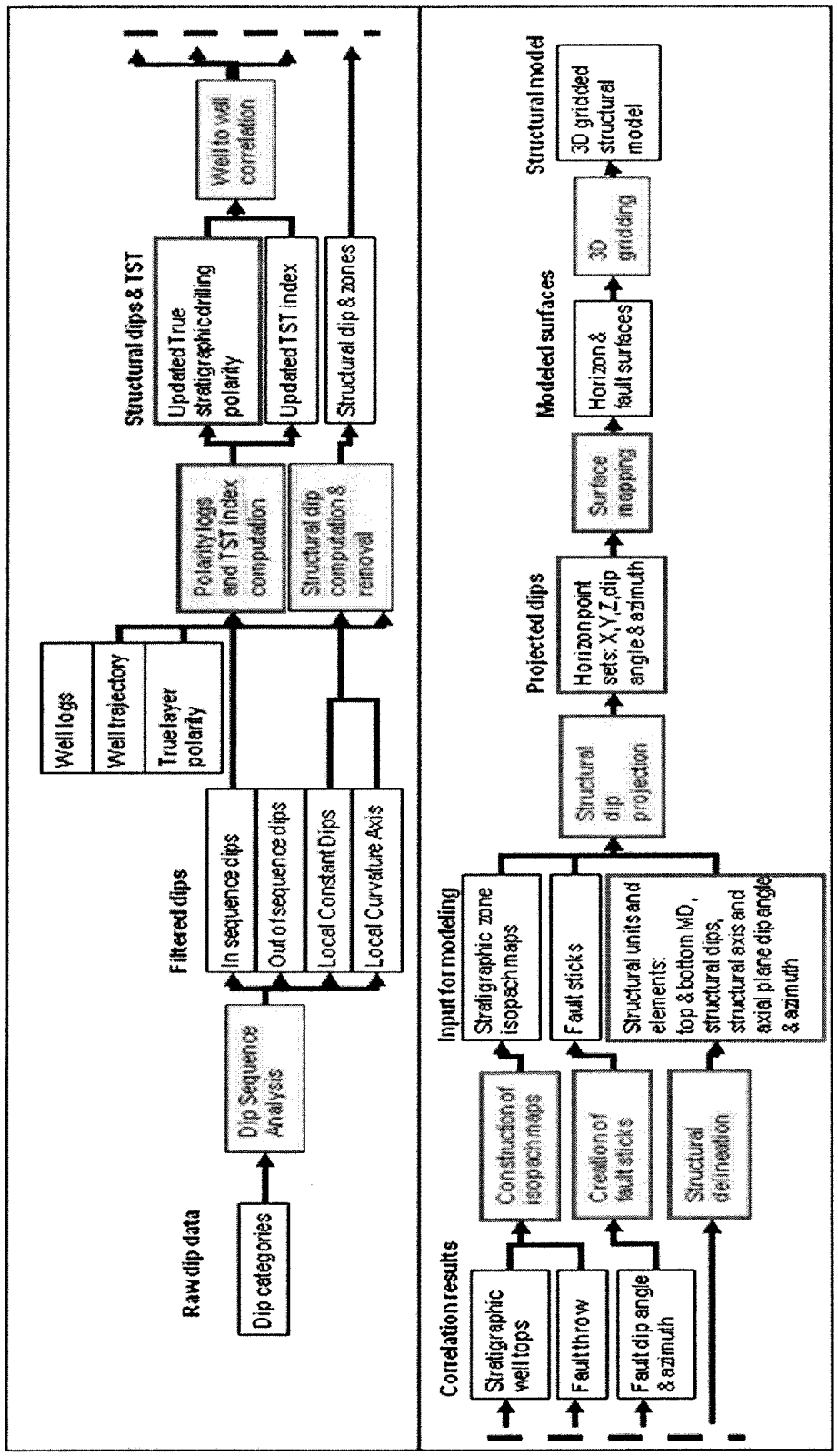
FIG. 2 shows a workflow of a method in accordance with one embodiment of the invention.

FIG. 2 is a representative workflow in accordance with embodiments of the present invention. The workflow may be based on wellbore data alone, or in combination with other log data. The required data may include, for example, borehole dips, layer polarity, well logs for well to well correlations, and well trajectories.

In the first part of the workflow, for each well included in a structural modeling, dips of sedimentary surfaces are picked on borehole images. This may be automatically processed from the wellbore images. Dip planes picking may be performed with any methods known in the art.

At this stage of interpretation, sedimentary surface dip picked on a borehole image may be considered as raw data, which may require further processing to extract their structurally significant components. In accordance with embodiments of the invention, the raw dip data may be filtered based on dip sequence geometrical criteria, for example to identify "in sequence" dips and "out of sequence" dips. "In sequence dips" are the dips satisfying the parameters of the dip sequence analysis process. For example, dip data obtained through a dipmeter may include erratic dips or dip sequences that are too short to be tectonically relevant, and those can be removed by filtering. Such filtering may include assigning each dip a quality level, filtering the dips based on a predefined quality level and filtering the dip sequences shorter than a predefined minimum sequence length.

The "in sequence" dips are then processed to extract the structural components of the dips: "local constant dips" and "local curvature axis." "Local constant dip" is an average dip of a group of "in sequence dips" satisfying the parameters defined during the local structural component computation. The "local curvature axis" is the axis of the curvature defined by a group of "in sequence dips". This operation is known in the art. For example, this process has been implemented in the application SediView of GeoFrame® software platform. In accordance with embodiments of the invention, this operation may be performed with a Dip Sequence Analysis process.

Figure 3:
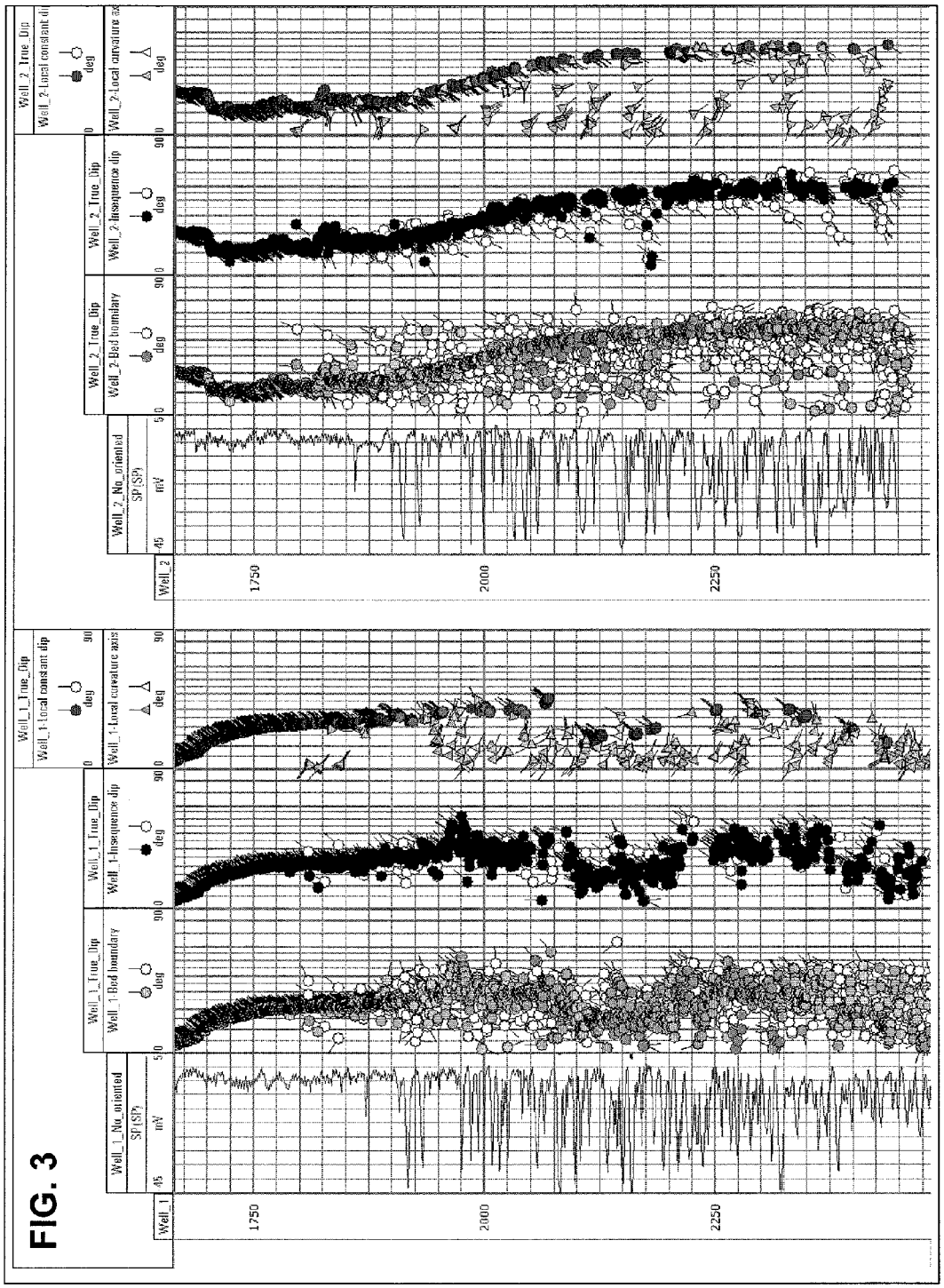
FIG. 3 shows results from a dip sequence analysis process in accordance with one embodiment of the invention.

FIG. 3 shows exemplary results from Dip Sequence Analysis processing, according to embodiments of the invention. In FIG. 3, the graphs are shown relative to measurement depths (MD) of the wells. Well #1 is shown on left and well #2 is shown on right. In each well, four panels represent (from left to right): the spontaneous potential (SP) curve, the raw dips as computed from dipmeter data, the "In Sequence" filtered dips, and the local structural components (local constant dips and local curvature axis). While examples shown here use dipmeter data, one skilled in the art would appreciate that other well log data may be used to provide well image without departing from the scope of the invention. The well image data may be obtained using logging tools (e.g., gamma ray, resistivity, ultrasonic or density imaging tools) in a wellbore.

Next, the filtered "in Sequence" dips are used as input for the computation of a "True Stratigraphic Thickness" (TST) index. TST represents the thickness of a layer measured perpendicular to its surface boundaries. The TST index is a measure of the true formation thickness crossed by the well for each increment of depth measured along the well (MD). The apparent dip (relative to the well axis) of the "In Sequence" dips can be used to compute thicknesses of the stratigraphic layers, which are then used to construct a continuous TST index. The TST index is a "cumulative" TST curve that gives the relative TST distance between any point of the well and a user/operator defined zero start depth position. The thickness of a bed or rock body can be corrected by using the dips of the bed or body and the deviation of the well that penetrates it. The values of true stratigraphic thickness in an area can be plotted to generate contours of the bed or rock body, and those contours can be used to create an isopach map.

At the same time, polarity logs are performed. The polarity logs integrate data concerning well logs, well trajectory and "True layer polarity." The "true layer polarity" log is the record of the stratigraphic polarity of the layers. The polarity of a layer may be normal or reverse. Normal polarity means that the layer lies with its stratigraphic base below its stratigraphic top. In other words, since its deposition (in horizontal position), if the layer has been tilted by some tectonic event (folding for example), the tilt angle is lower than 90 degrees. Reverse polarity indicates that the layer lies with its stratigraphic base above its stratigraphic top, which means the layer has been tilted by some tectonic event (folding for example) and the tilt angle is higher than 90 degrees. In accordance with embodiments of the invention, the true layer polarity is set to NORMAL by default when the log is automatically created by the process. When some layers with dip angles close to vertical observed, the true layer polarity, the setting of the layer polarity will be reconsidered and corrected, if necessary. Criterions like the stratigraphic correlation with offset wells, fossils observation, ichnotraces or sedimentary structures can be used by the interpreter to correct the layer polarity.

With the TST index and true layer polarity data, a "Stratigraphic Drilling Polarity" log may be computed. This log shows whether the well is "stratigraphically" drilled down (from younger to older formation) or "stratigraphically" drilled up (from older to younger formation). In accordance with embodiments of the invention, this computation will provide updated true stratigraphic drilling polarity and updated TST index. In accordance with embodiments of the invention, the true stratigraphic drilling polarity is set to DOWN by default when the log is automatically created by the process. In accordance with embodiments of the invention, the true stratigraphic drilling polarity will be automatically updated with respect to the well trajectory, the dips of the layers and their true layer polarity.

Figure 4:
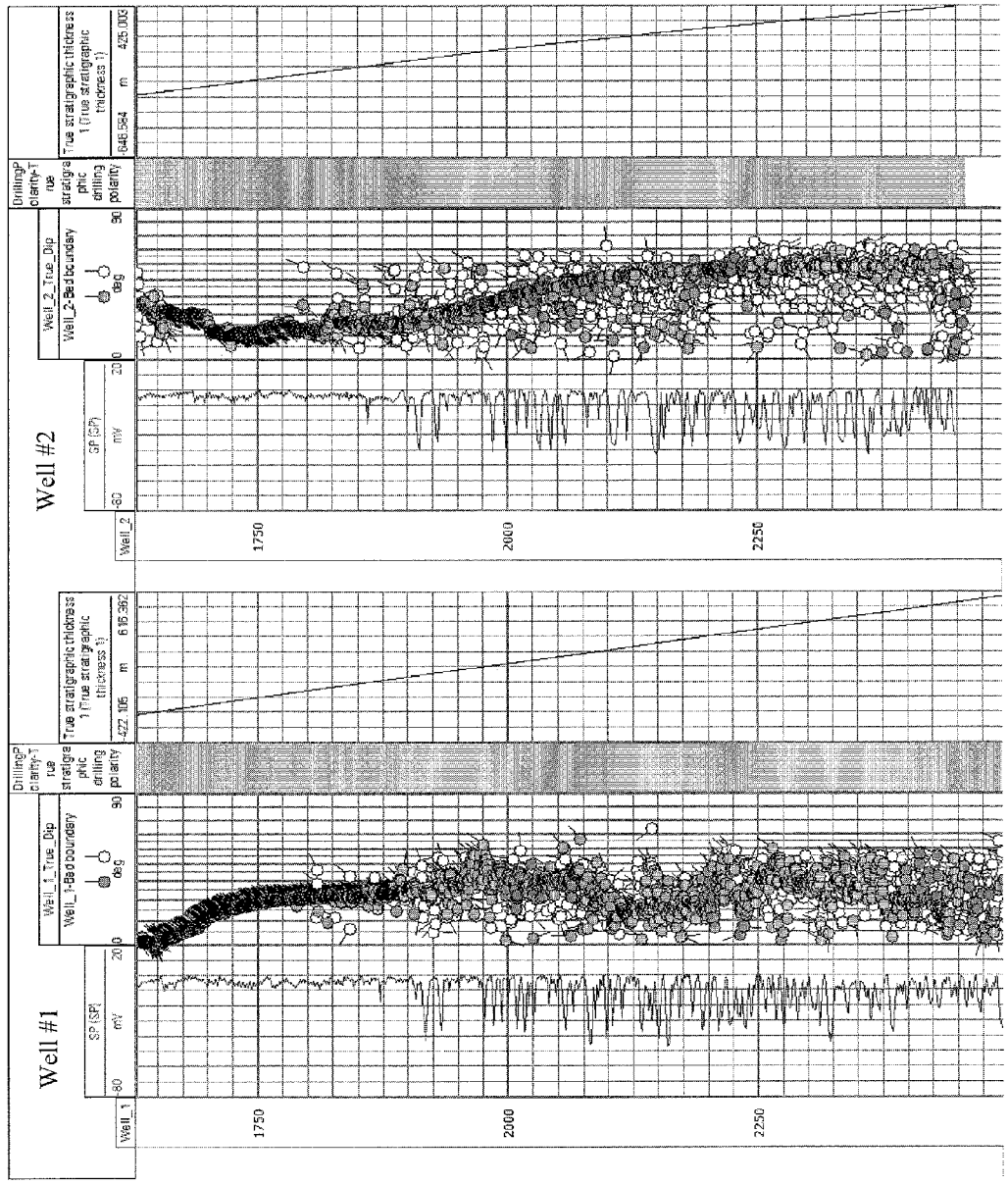
FIG. 4 shows results from a polarity log and TST computation process in accordance with one embodiment of the invention.

FIG. 4 show exemplary results from a polarity log and TST index computation process in accordance with embodiments of the invention. In FIG. 4, the left panel shows well #1 and the right panel shows well #2. In each well, four sets of data are shown (from left to right): the SP curve, the raw dips computed from dipmeter data, the stratigraphic drilling polarity zone log (which may be represented with one color for drilling down and another color for drilling up), and the TST index curve.

Next, the "local constant dips" and "local curvature axis" data may be used as input in an interactive process to define structural zones. Each structural zone may be approximated to a depth zone with a constant (or within a small variation) structural dip. The depth zone may be interactively created by an interpreter on a log display window of input dips, and the validity of the constant (or a small variation) structural dip may be simultaneously cross checked in a Schmidt stereonet display of the dips contained in the selected zone. A unique structural dip may be computed for each structural zone. This operation, which may be considered as an upscaling of the borehole dip data, is performed with a Structural Dip Computation process, according to embodiments of the invention.

Figure 5:
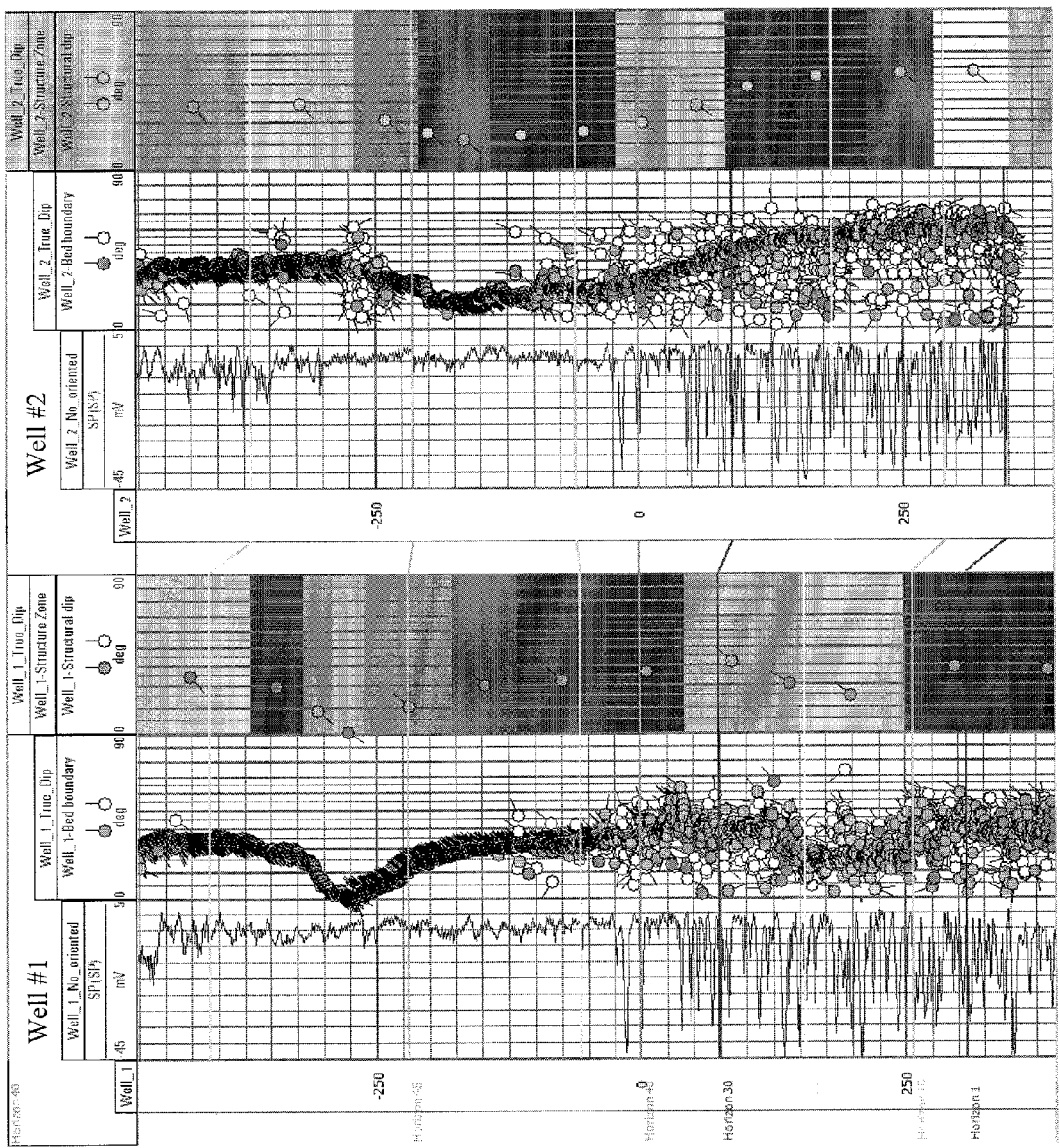
FIG. 5 shows results from a structural dip computation process in accordance with one embodiment of the invention.

FIG. 5 shows exemplary results from a structure dip computation process in accordance with embodiments of the invention. As shown in FIG. 5, the left panel is Well #1 and the right panel is Well #2. In each well, three sets of data are shown (from left to right): the SP curve, the raw dips computed from dipmeter data, and the structural dips resulting from the structural dip computation process. The structural dips represent a consistent upscaling of the raw dip data.

Figure 6:
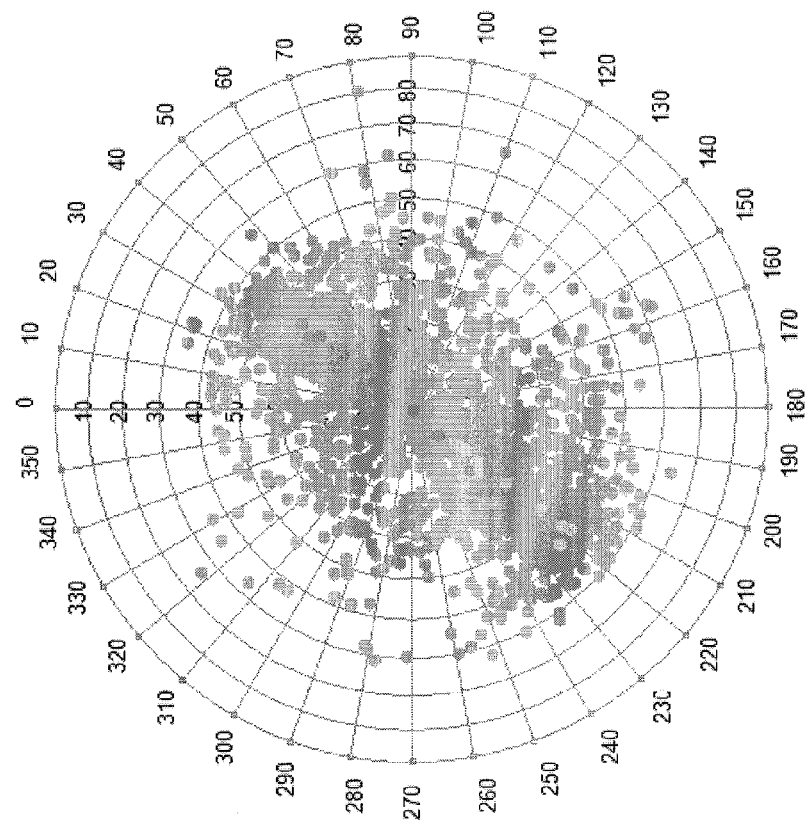
FIG. 6 shows results from a structural dip computation process displayed in a stereonet graph in accordance with one embodiment of the invention.

FIG. 6 shows, in another representation (a Stereonet representation), the results from a structure dip computation process shown in FIG. 5. In FIG. 6, the bed boundary dips and the structural dips resulting from the structural dip computation process are presented in a Stereonet. The structural dips represent a consistent upscaling of the raw dip data. Note that the succession of "Dip Sequence Analysis" and "Structural Dip Computation" processing cleaned up the apparent scattering of the raw dip data. As a result, a clear alignment of the structural dip points from the two wells appears on a unique circle.

After the dip points have been analyzed and processed, methods of the invention may be used to propagate the structural dip information observed along wells into a near well structural model. In accordance with embodiments of the invention, processes of Structural Delineation, Structural Dip Projection, and Surface Creation may be applied to propagate the dip information into the formation.

In accordance with embodiments of the invention, Structural delineation represents a key step of the structural modeling. In the structural delineation, the concepts of structural units and structural elements are used. These structural units and elements may be interactively defined by joint analysis of the structural dip computation results from multiple wells.

As used in this description, a "structural unit" is a structurally and stratigraphically independent volume of space. A typical boundary between two units is an unconformity surface. Consequently, a unique stratigraphic surface cannot be observed in two different units, and a structural dip defined in a structural unit 1 will never be used to model a stratigraphic surface observed in a structural unit 2.

As used in this description, a "structural element" is a volume of space that is a part of a structural unit and is characterized by its unique association of structural axis and dip translation plane. A typical boundary between two elements is a fault surface. However, a boundary is not necessarily a real physical surface. Therefore, a unique stratigraphic surface can be observed in two different elements, and a structural dip defined in a structural element 1 may be used to model a stratigraphic surface observed in a structural element 2

Figure 7:
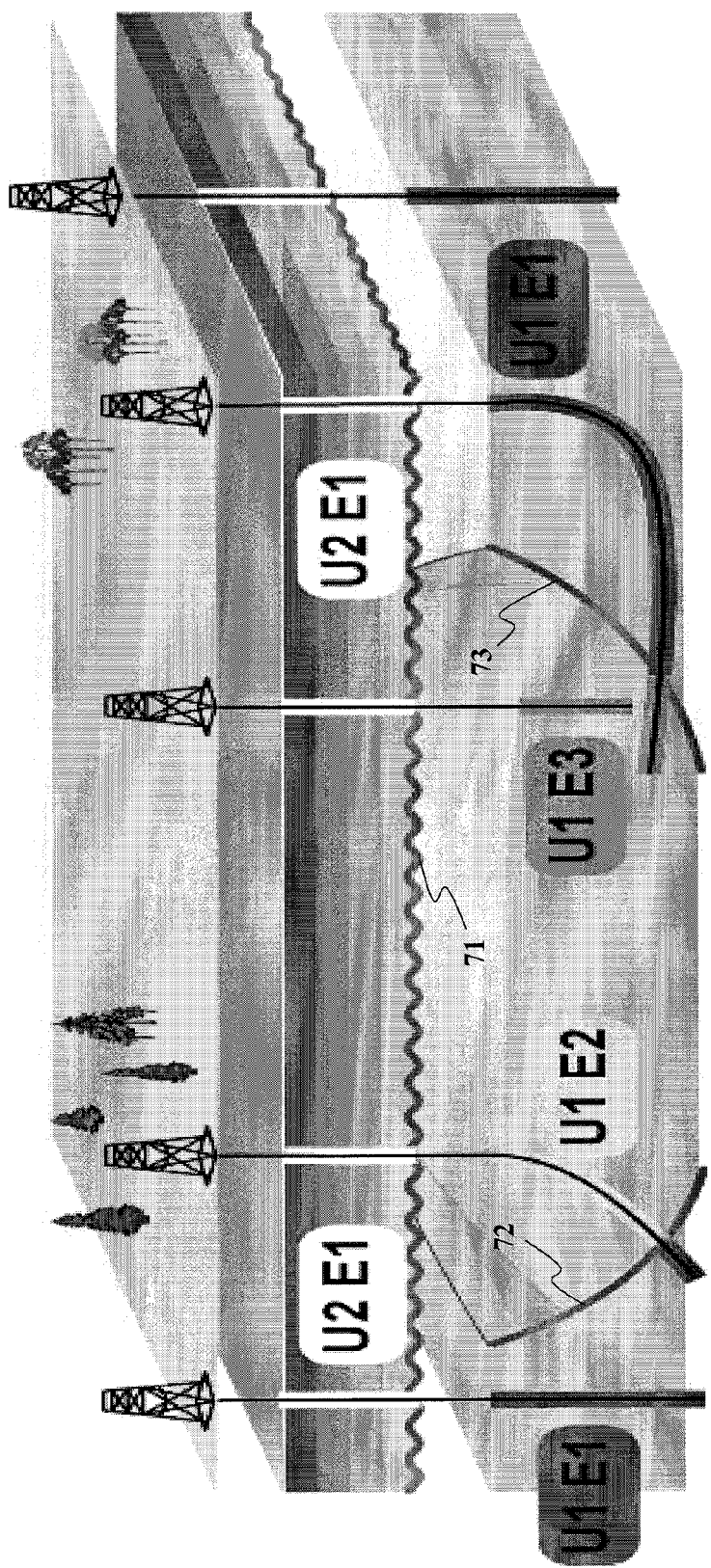
FIG. 7 shows a formation modeling illustration a principle of multi-well structural delineation in accordance with one embodiment of the invention.

FIG. 7 illustrates a principle of multi-well structural delineation in accordance with embodiments of the invention. FIG. 7 shows a scenario, in which 2 structural units (U1 and U2) are bounded by an unconformity surface 71. The structural unit 2 (U2) has no fold or faults and contains a unique structural element shown by the top section of each well (U2E1).

The structural unit 1 shows 2 faults, and, therefore, there are 3 structural elements (U1E1, U1E2, and U1E3). Element U1E1 represents undeformed layers and is shown in 4 well sections. Elements U1E2 and U1E3 represent the deformation against the faults 72, 73 and are, respectively, shown in 1 and 2 well sections. This scenario illustrates that the "structural delineation" process consists of characterizing and merging identical structures (and hence structural elements) potentially observed in more than one well.

To perform the structural delineation, one first needs to define the structural units and elements and to assign sections of the studied wells to the various units and elements. To do so, one would simultaneously display the structural dips of all wells in a log tadpole plot (as shown in FIG. 8) and in a Stereonet plot (as shown in FIG. 9).

Figure 8:
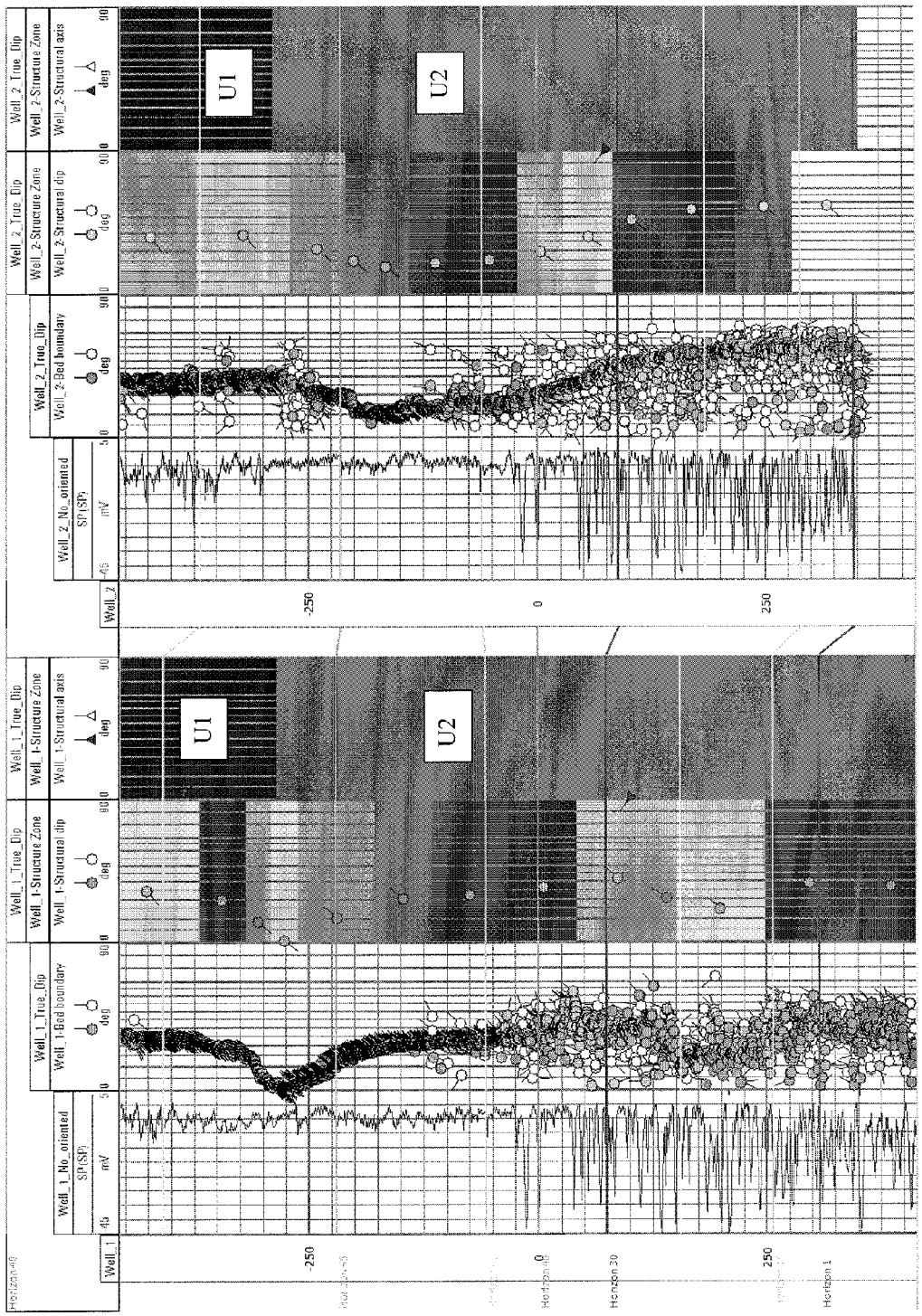
FIG. 8 shows results from a structural delineation process in accordance with one embodiment of the invention.

FIG. 8 shows exemplary results from a structural delineation process. As shown in FIG. 8, the left panel is well #1 and the right panel is well #2. In each panel, there are four sets of data shown (from left to right): the SP curve, the raw dips computed from dipmeter data, the structural dips (and their structural zones) resulting from the structural dip computation process (described above), and 2 structural units (U1 and U2). In this example, each structural unit contains only one element. The structural axes of the elements are also displayed in the element zone track. Several formation tops correlated between the 2 wells are displayed (note the TST index). Stratigraphic zone thickness provided by the correlation and the TST index may be used as input for the isopach map creation process, which will be described in a later section.

Figure 9:
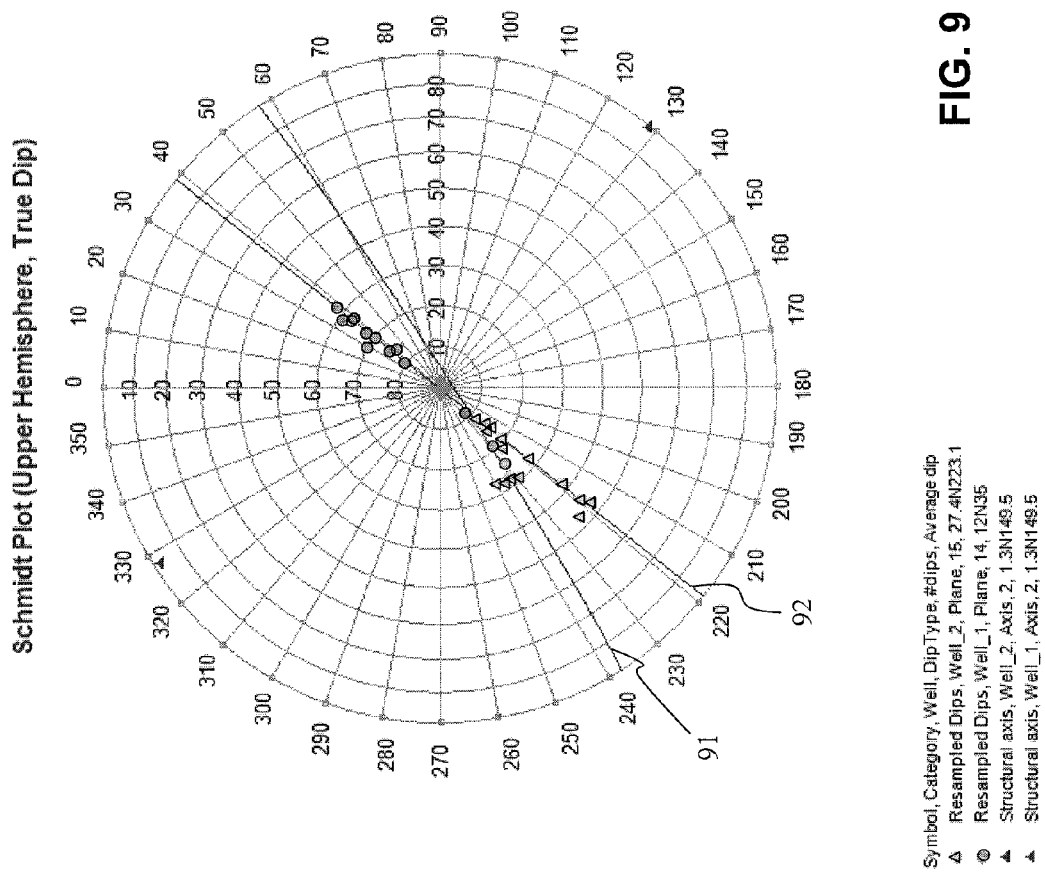
FIG. 9 shows results from a structural delineation process displayed in a stereonet graph in accordance with one embodiment of the invention.

FIG. 9 shows structural delineation results in a Stereonet display. Structural dips of the well 1 (circle points) and the well 2 (triangle points) have been merged into this structural delineation display. Two structural units/elements have been characterized and their respective structural axis computed. The 2 dip trends, evidenced by the 2 structural elements, can be derived from their respective great circle fits, shown as lines 91 and 92 in this plot. One may observe that the two dip trends/structural elements (evidenced by lines 91 and 92) are defined by structural dips derived from data obtained from both wells (circle and triangle points).

When a depth section containing a sequence of structural dips is defined, the best fit great circle and the structural axis dip of the selected dip sequence may be computed. When several sections defined in different wells present the same structural axis, they may be interpreted as parts of the same structure (e.g., several wells drilled through the same fold anticline), and they may be assigned to a single structural element, as illustrated in FIG. 10.

Figure 10:
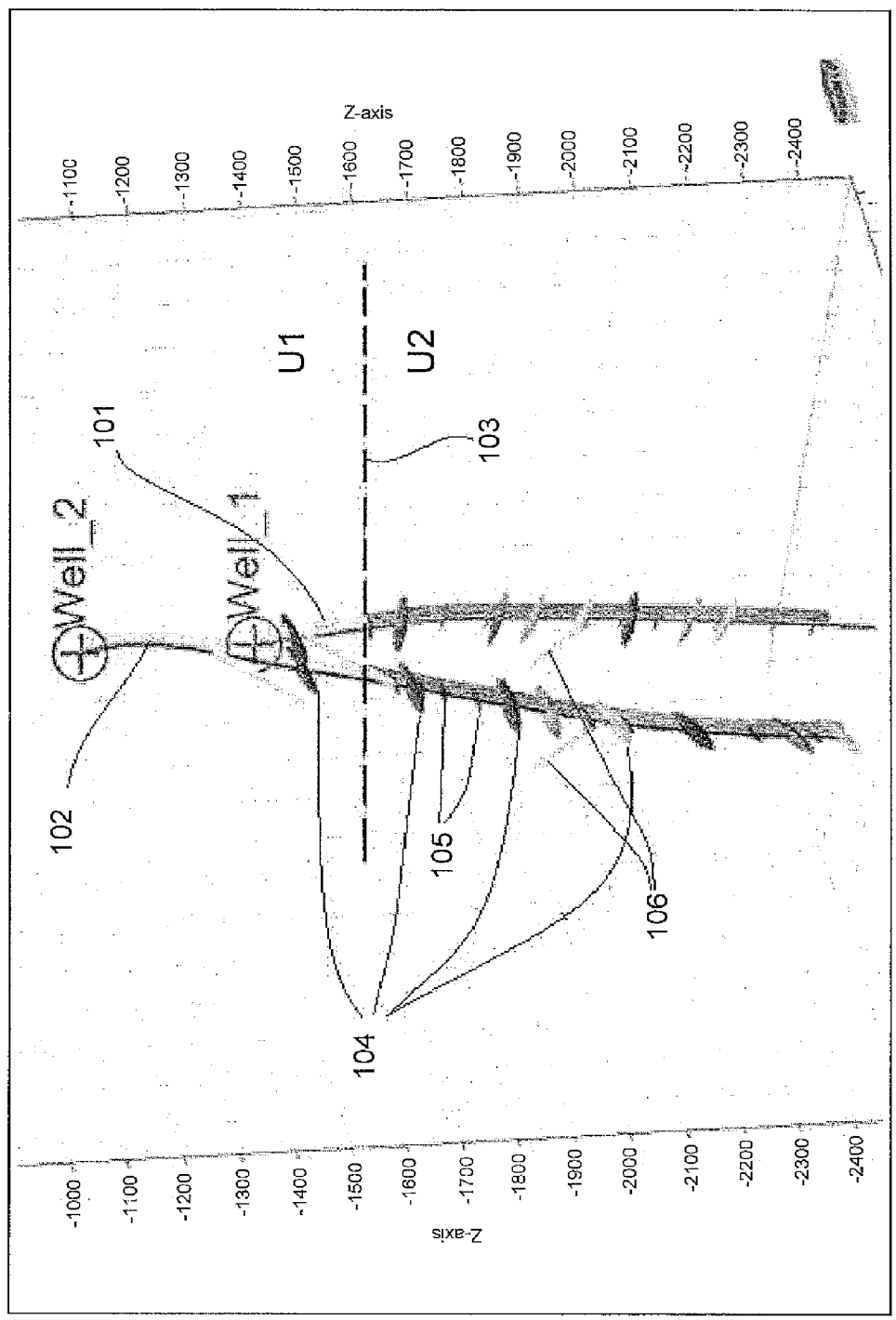
FIG. 10 shows a 3D display of a formation model, including formation well tops, structural dips, and structural element axis, computed along wells in accordance with one embodiment of the invention.

FIG. 10 shows a 3D display of formation well tops, structural dips and structural element axis computed along the wells. Two wellbore trajectories are shown, Well_1(101) and Well_2(102). The formation well tops 104 are shown as the bigger disks aligned along the wellbore trajectories 101 and 102. Formation tops representing the intersection of wellbore with formation interface that are identified and picked based on well logs. The structural dips 105 are shown as the smaller disks along the wells. The two structural units/elements (shown as U1 and U2, see also FIG. 7) are shown separated at a boundary, illustrated as the dotted line 103. The structural axes computed for each of the structural elements are displayed on this 3D view as sticks 106. The structural axis will guide the direction of projection of the structural dips away from the wells and into the formation, to be described later.

Next, a user may edit the dip projection plane. The translation planes contain the structural axes (106 shown in FIG. 10). It may be an axial plane of a fold, or a plane presenting a dip close to the fault plane when the modeled structure is faulted (i.e., contains one or more faults or fractures). This operation, defining the geometrical guidelines of the structural dip projections, may be performed with the Structural Delineation process described above.

Formation tops may be identified and picked based on well logs. With the help of the TST depth index, well to well correlation may be much more accurate between repeated sections observed in horizontal wells. Formation tops and their TST index may be used to generate layer thickness (isopach) maps for every stratigraphic zone defined between two successive stratigraphic tops. An isopach is a contour that connects points of equal thickness. Commonly, the isopachs, or contours that make up an isopach map, display the stratigraphic thickness of a rock unit as opposed to the true vertical thickness. Isopachs are true stratigraphic thicknesses; i.e., perpendicular to bedding surfaces. In addition to the TST of the stratigraphic zones, the maps may also provide the SCOD (Stratigraphic Component Of the Dip) indicating the angle between the layer top and bottom surface. This angle is introduced by layer thickness changes. This operation may be performed with an Isopach Map Creation process.

Figure 11:
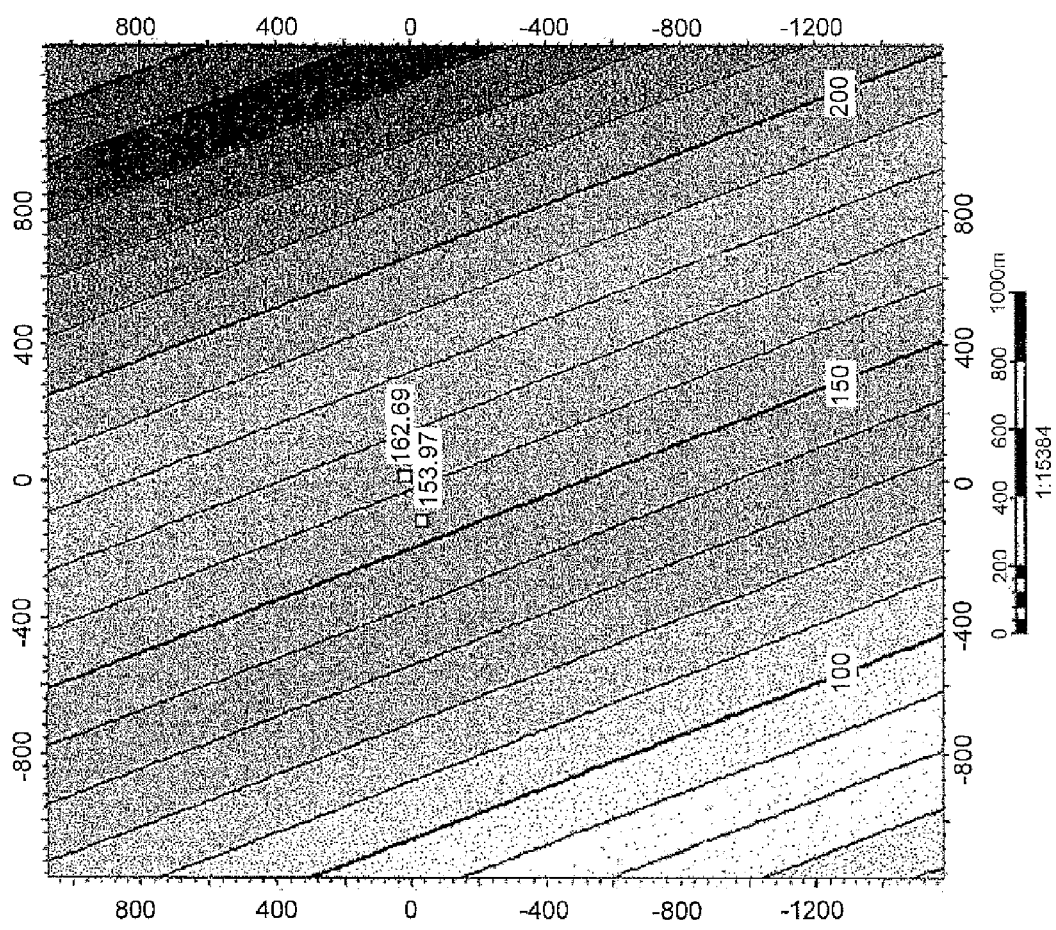
FIG. 11 shows an isopach map of one stratigraphic zone in accordance with one embodiment of the invention.

FIG. 11 shows an example of an Isopach map of one stratigraphic zone. In case of default of other source of layer thickness information, the layer thicknesses observed at the well intersections are used to define the trends of the isopach maps. One isopach map may be computed for each stratigraphic zone defined between two stratigraphically successive formation well tops.

The structural element properties (structural axis and translation plane dips) and layer thickness maps are then used as input for the structural dip projection process. When the modeled structure is faulted, the projection of structural dips should be bounded by the fault surfaces. The faults may be interpreted from borehole images, well log data (e.g., resistivity log), or seismic interpretation. Any fault interpretation methods known in the art may be used with embodiments of the invention. In accordance with methods of the invention, a "Fault Stick Creation" process may be used to help an interpreter create a planar surface (defined by sticks), representing a unique fault plane intersected by a well. Fault sticks may be edited to represent more complex fault geometries and to manage fault surface intersections.

The structural dips computed along the well(s) are then projected (propagated) into the near well space. The projection is primarily defined by a structural model. The interpreter may choose a percentage between a pure parallel and a pure similar fold model.

Figure 12:
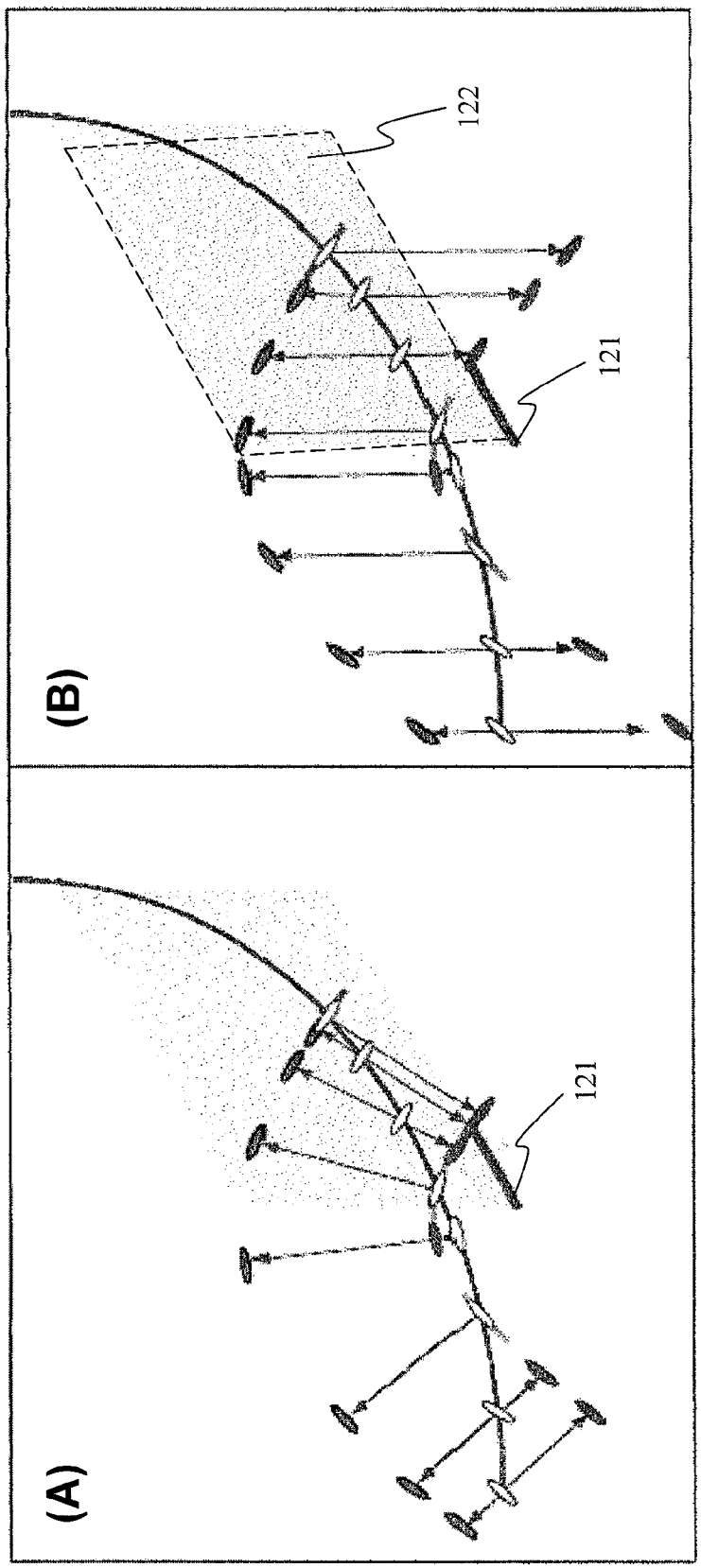
FIG. 12 shows a principle of structural dip projection away from the well in a parallel and a similar fold model in accordance with one embodiment of the invention.

FIG. 12 illustrates a principle of the structural dip projection away from the well in a parallel and a similar fold model. With a parallel fold model (FIG. 12(A)), the first projection of the structural dips is perpendicular to the dip surface and perpendicular to the structural axis (line 121). In accordance with embodiments of the invention, each structural dip is projected to a distance determined based on the adjusted TST index and isopach maps. The adjusted TST index provides true formation thickness crossed by the well for each increment of depth measured along the well, thereby the stratigraphic thickness between the structural dip point and a closest formation well top (e.g. a formation layer top) will be obtained. In the parallel fold model, such thickness is the distance to be projected perpendicular to the dip surface. On the other side of the dip surface, the projection distance is determined by the isopach maps and the adjusted TST index. The isopach maps provide the true stratigraphic thicknesses of formation layers, thereby the true stratigraphic thickness from the structural dip to the other side of the rock (e.g. a formation layer bottom).

With a similar fold model (FIG. 12(B)), the first projection of the structural dips is parallel to the translation plane of the fold (plane bisector 122 of the fold limbs) and perpendicular to the structural axis (line 121). In accordance with embodiments of the invention, each structural dip is projected to a distance determined based on the adjusted TST index, the isopach maps and corresponding dip angle of the structural dip. In a workflow according to embodiments of the invention, an interpreter (user) may choose a percentage between a pure parallel and a pure similar fold model. Thus, the distance of such projection could be further adjusted by the percentage and the direction of the projection by the dip angle multiplied by the percentage.

Then, each structural dip point may be projected away from the wellbore according to its structural element properties, the selected model, and the layer thickness maps. When required, the projection of structural dips may be bounded by selected fault surfaces. Each structural dip of a structural unit is projected (if required) in all formation top surfaces to be modeled. However, each structural dip should only be projected within the corresponding structural unit, for example, a structural dip of the zone U1E2 (as shown in FIG. 7) must be projected within U1, and should not be projected into zone U2E1.

In accordance with embodiments of the invention, each structural dip is projected to the corresponding formation top and bottom surfaces and can be projected to the surfaces of adjacent layers (as shown in FIG. 13(*b*)), and a user/operator may determine how many layer surfaces will be involved in the projection. In accordance with embodiments of the invention, each of the formation tops 104 (as shown in FIG. 10) is projected to the corresponding formation top and bottom surfaces and the surfaces of adjacent layers (as shown in FIGS. 13(*a*) and 13(*b*)).

In accordance with embodiments of the invention, the formation well tops are projected to horizon points together with the structural dips. In a parallel fold model, the first projection of the formation well tops is perpendicular to the surface of the well top and perpendicular to the structural axis, and the distance of the projection is the true formation thickness derived from isopach maps. With a similar fold model, the first projection of the formation tops is parallel to the translation plane of the fold and perpendicular to the structural axis, and the distance of the projection is determined by the true formation thickness derived from isopach maps and the angle of the well top.

Figure 13A:
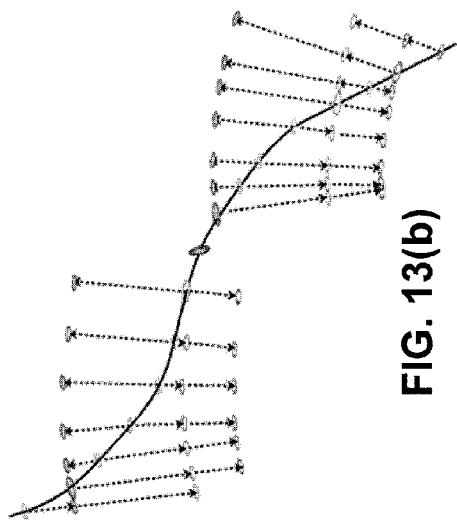
FIG. 13(a)-13(d) show a process for projecting structural dips and well tops in horizon point sets in the near well space in accordance with one embodiment of the invention.
Figure 13B:
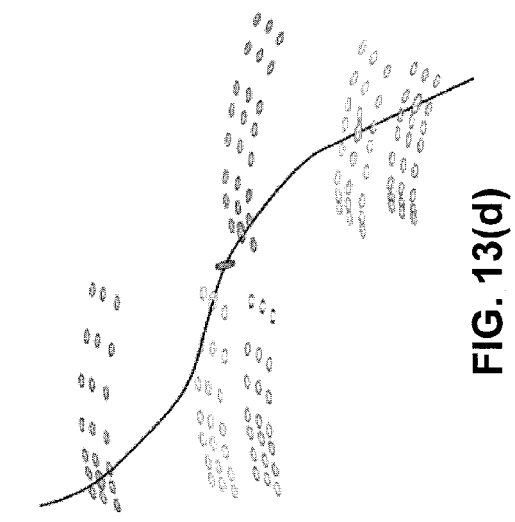
Figure 13C:
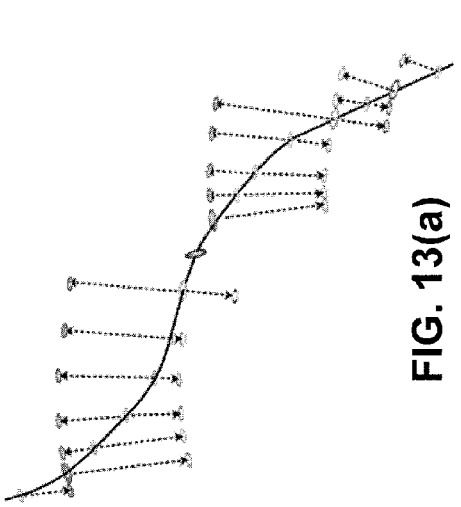
Figure 13D:
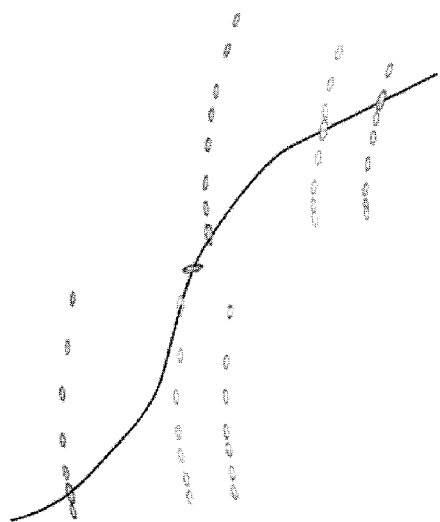

In accordance with embodiments of the invention, the result of the projection of structural dips and well tops is a string of horizon points (as shown in FIG. 13(c)). The horizon point string is further projected laterally (as shown in FIG. 13(d)). The direction of such lateral projection is parallel to the structural axis of the formation element, and the distance of such lateral projection is defined by user/operator. In accordance with embodiments of the invention, the lateral projection can be repeated multiple times with a unique incremental distance for such projection.

Figure 14:
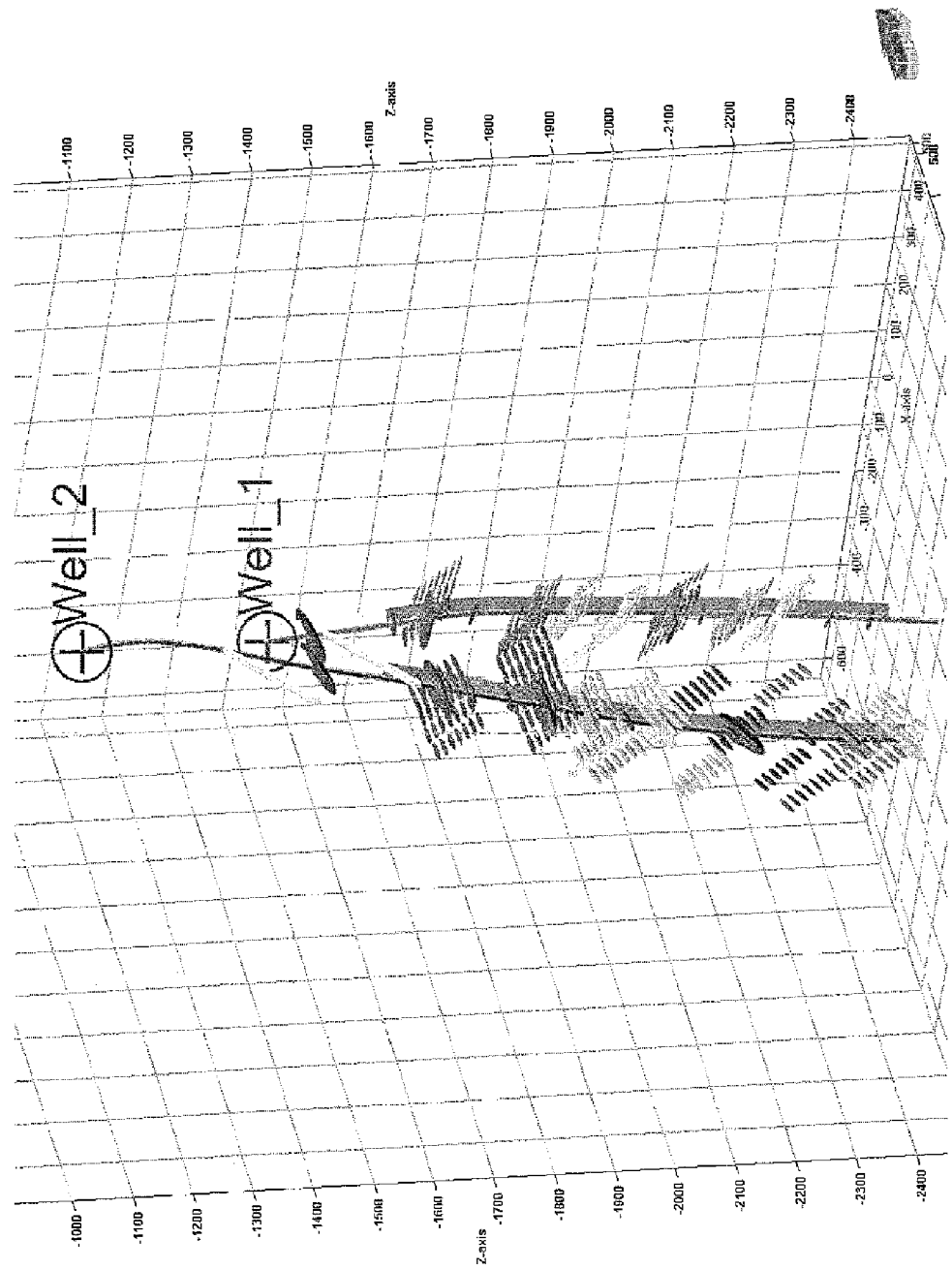
FIG. 14 shows a 3D display of structural dips projected in horizon point sets in the near well space in accordance with one embodiment of the invention.

As shown in FIG. 14, the output of the projection is a point set for each formation top surface. Each point in a point set may be characterized by its spatial coordinates (X, Y, Z), its dip (dip angle and azimuth/stratigraphic surface name), and its type (regular point or well top point). The well top point is the actual intersection of the formation top surface by the well; the regular point is a projected point. Each point set materializes a modeled sample of each formation top surface. The structural dip projection may be performed with a Structural Dip Projection process in accordance with embodiments of the invention.

FIG. 14 shows a 3D display of structural dips projected in horizon point sets in the near well space. As shown in this example, the structural dips of the lower structural element have been projected away from the wells into the various formation surfaces. The projection direction and distance may be conditioned by the stratigraphic zone thicknesses, the structural model, and the structural axis direction. In the example, one point set is created for each stratigraphic horizon.

Figure 15:
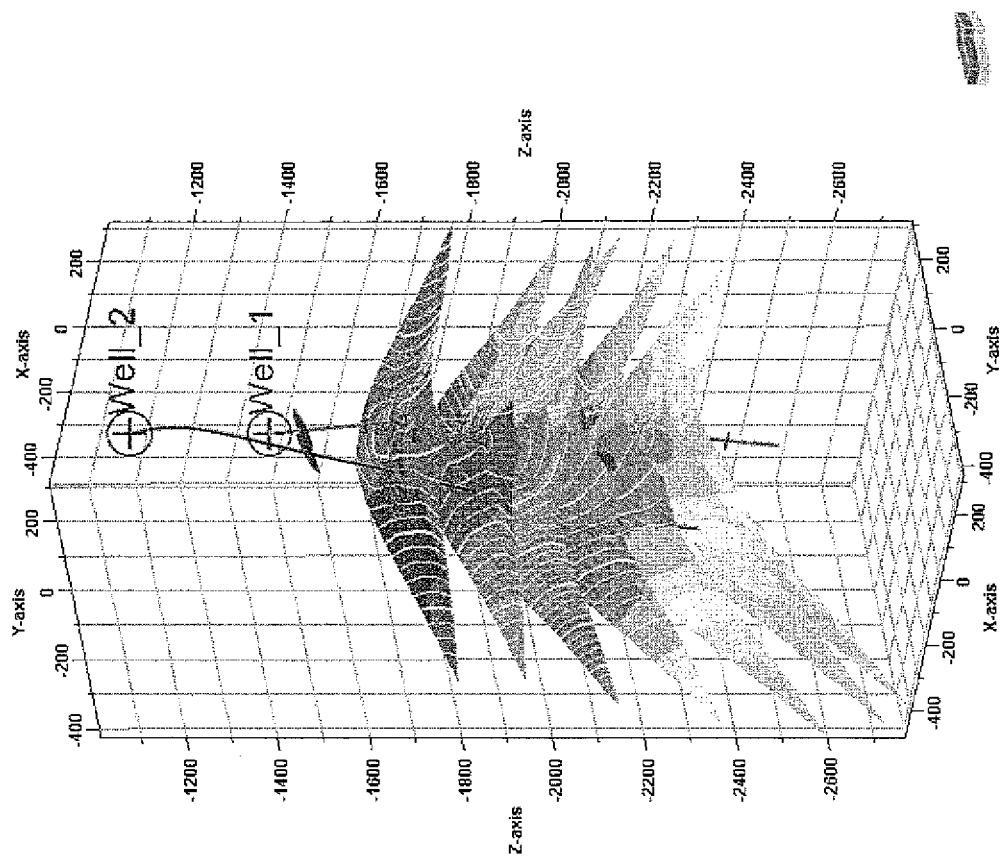
FIG. 15 shows a 3D display of horizon surfaces mapping the horizon point sets in accordance with one embodiment of the invention.

The point sets resulting from the structural dip projections are mapped into horizon surfaces. The mapping algorithm, which may be based on B-spline function, may allow the user to fit the horizon point set by taking into account balancing of the points dip and position. On the other hand, the interpreter (user) may balance the respective weights of the regular and the well top points. Interpreter may also adjust the tension of the fitting surface. A lower tension may allow for taking into account local properties. On the other hand, a higher tension may enhance the larger trends. FIG. 15 shows a 3D display of the horizon surfaces mapping the horizon point sets, resulted from such a process.

Figure 16:
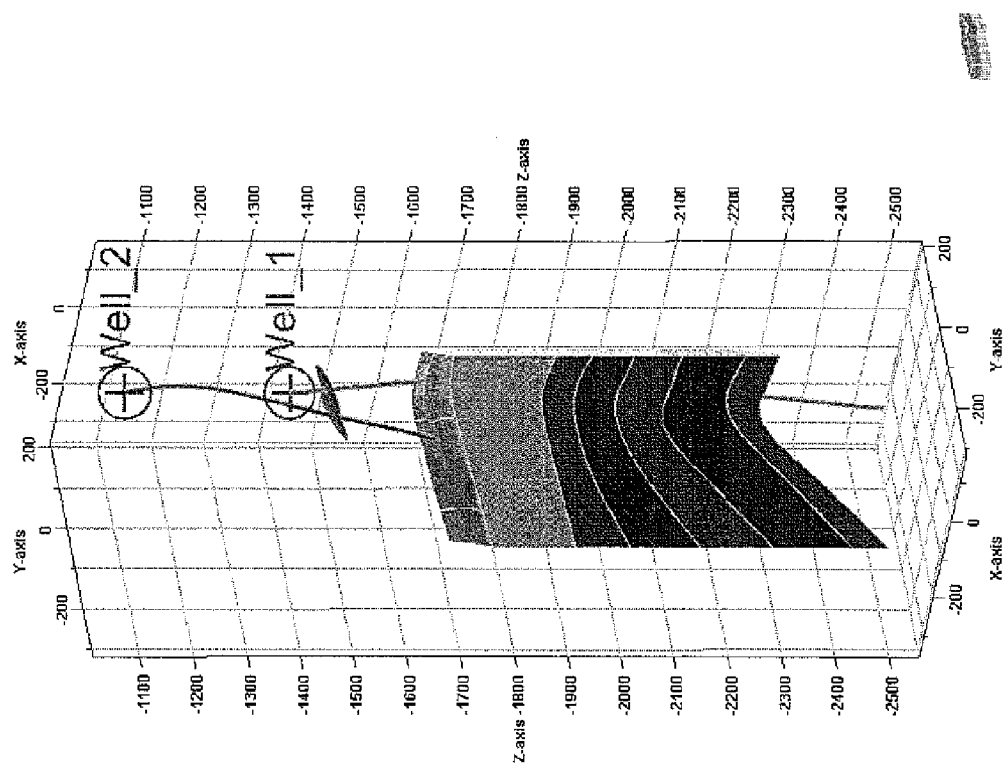
FIG. 16 shows a 3D gridded volume of a structure model computed in accordance with one embodiment of the invention.

In accordance with some embodiments of the invention, a workflow of the invention may reintegrate prior art workflow. Based on the horizon surfaces (as shown in FIG. 15), the interpreter may locally update an existing seismic interpretation (or other similar information) or may create a 3D grid of the structural model for further near well reservoir modeling. FIG. 16 shows an example of a 3D gridded volume of the structural model produced by the workflow.

Figure 17:
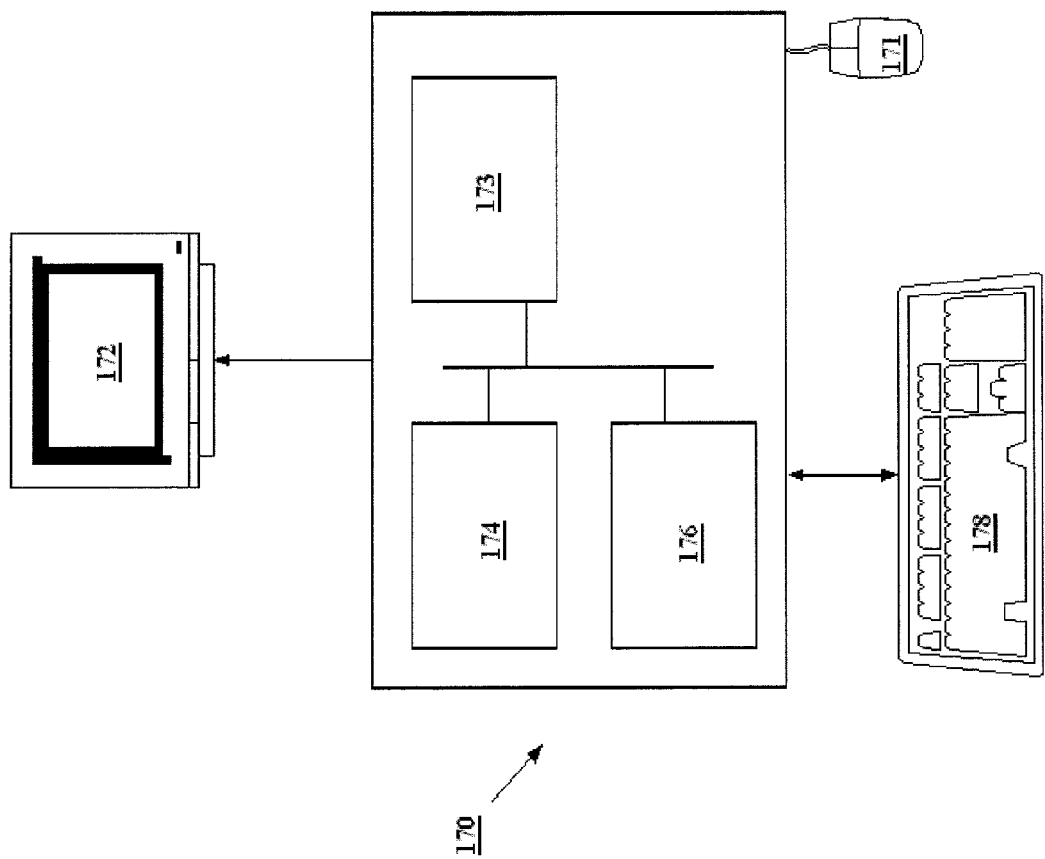
FIG. 17 shows a convention computer that may be used to implement embodiments of the invention.

A workflow of the invention may be implemented in any computing system, including personal computers. FIG. 17 shows an example of a computer that may be used with embodiments of the invention. As shown, a computer system 170 may include a display 172, a processor 173, a storage memory 174, and random access memory 176. In addition, the computer system may include input devices, such as a mouse 171 and a keyboard 178.

Some embodiments of the invention may relate to a computer readable medium, such as a floppy disk, an optical disk (CD or DVD), a hard drive, etc., that includes a program having instructions for performing a workflow or method of the invention.

Embodiments of the invention may include one or more advantages as follows. Methods of the invention can provide formation models with dips projected away from the wellbore into formations surrounding the wellbore. Methods of the invention also provide more reliable delineation of formation elements and dips information. The step of structural dip projection into set of points, prior to the horizon surface creation has several advantages, such as: (1) quality control and editing of the projected dips before the horizon surface creation; (2) capability to merge several rounds of dip projection with different projection plane into a unique horizon surface creation (for optimizing the extension of the created surfaces); and (3) capability to merge several rounds of dip projection with different fold model into a unique horizon surface creation (for varying the fold model across the tectonic structures).

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for structure modeling of a formation penetrated by multiple wells, comprising:
   obtaining borehole dips from borehole measurements;
   filtering the borehole dips based on a dip sequence analysis;
   computing, by a processor, structural dips based on the filtered dips;
   computing, by the processor, structural delineation by using the structural dips, wherein computing structural delineation comprises defining one or more structural volume units having one or more structural volume elements;
   characterizing and merging similar structural volume elements;
   projecting the structural dips to horizon point sets based on the structural delineation; and
   generating stratigraphic surfaces by mapping the projected horizon point sets.

2. The method of claim 1, wherein the projecting the structural dips comprises projecting each of the structural dips perpendicular to a corresponding dip surface and perpendicular to a structural axis.

3. The method of claim 1, wherein the projecting the structural dips comprises projecting each of the structural dips in a direction parallel to a translation plane of a corresponding fold and perpendicular to a structural axis of the corresponding fold.

4. The method of claim 1, wherein the projecting the structural dips further comprising projecting each of the structural dips to a distance determined by true stratigraphic thickness of a corresponding formation layer and isopach maps.

5. The method of claim 4, wherein the true stratigraphic thickness is derived from the dip sequence analysis and is further determined by a true stratigraphic drilling polarity.

6. The method of claim 5, wherein the true stratigraphic drilling polarity is determined by well log data, well trajectory and true layer polarity data.

7. The method of claim 1, wherein the projecting the structural dips comprises projecting each of the structural dips to more than one horizons corresponding to different formation layer surfaces.

8. The method of claim 1, wherein the computing structural delineation comprises dividing formation into structural units, and each of the structural dips is projected only within one of the structural units to which the structural dip belongs.

9. The method of claim 8, wherein the computing structural delineation comprises identifying one or more structural units and one or more structural elements in the formation, by displaying the structural dips of the multiple wells in a log tadpole plot and a steronet plot.

10. The method of claim 2, wherein the projecting the structural dips further comprising projecting each of formation tops that are obtained through the well log together with structural dips.

11. A system for structure modeling of a formation penetrated by multiple wells, comprising a processor and a memory that store a program having instructions for:
obtaining borehole dips from borehole measurements;
filtering the borehole dips based on a dip sequence analysis;
computing structural dips based on the filtered dips;
computing structural delineation by using the structural dips, wherein computing structural delineation comprises defining one or more structural volume units having one or more structural volume elements;
characterizing and merging similar structural volume elements;
projecting the structural dips to horizon point sets based on the structural delineation; and
generating stratigraphic surfaces by mapping the projected horizon point sets.

12. The system of claim 11, wherein the projecting the structural dips comprises projecting each of the structural dips perpendicular to a corresponding dip surface and perpendicular to a structural axis.

13. The system of claim 11, wherein the projecting the structural dips comprises projecting each of the structural dips in a direction parallel to a translation plane of a corresponding fold and perpendicular to a structural axis of the corresponding fold.

14. The system of claim 11, wherein the projecting the structural dips further comprising projecting each of the structural dips to a distance determined by true stratigraphic thickness of a corresponding formation layer and isopach maps.

15. The method of claim 14, wherein the true stratigraphic thickness is derived from the dip sequence analysis and is further determined by a true stratigraphic drilling polarity.

16. The method of claim 15, wherein the true stratigraphic drilling polarity is determined by well log data, well trajectory and true layer polarity data.

17. The system of claim 11, wherein the projecting the structural dips comprises projecting each of the structural dips to more than one horizons corresponding to different formation layer surfaces.

18. The system of claim 11, wherein the computing structural delineation comprises dividing formation into structural units, and each of the structural dips is projected only within one of the structural units to which the structural dip belongs.

19. The system of claim 18, wherein the computing structural delineation comprises identifying one or more structural units and one or more structural elements in the formation, by displaying the structural dips of the multiple wells in a log tadpole plot and a steronet plot.

20. The method of claim 12, wherein the projecting the structural dips further comprising projecting each of formation tops that are obtained through the well log together with structural dips.

* * * * *